US012122160B2

(12) United States Patent
Kato

(10) Patent No.: US 12,122,160 B2
(45) Date of Patent: Oct. 22, 2024

(54) CHANNEL MEMBER AND LIQUID EJECTION HEAD

(71) Applicant: CANON KABUSHIKI KAISHA, Tokyo (JP)

(72) Inventor: Masataka Kato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 107 days.

(21) Appl. No.: 17/932,213

(22) Filed: Sep. 14, 2022

(65) Prior Publication Data

US 2023/0086168 A1 Mar. 23, 2023

(30) Foreign Application Priority Data

Sep. 17, 2021 (JP) ................................ 2021-151988

(51) Int. Cl.
*B41J 2/14* (2006.01)
*B41J 2/16* (2006.01)

(52) U.S. Cl.
CPC ......... *B41J 2/14233* (2013.01); *B41J 2/1607* (2013.01); *B41J 2/1623* (2013.01); *B41J 2/1628* (2013.01); *B41J 2/1629* (2013.01); *B41J 2/1631* (2013.01); *B41J 2/1642* (2013.01); *B41J 2/1645* (2013.01); *B41J 2/1646* (2013.01)

(58) Field of Classification Search
CPC .... B41J 2/14233; B41J 2/1623; B41J 2/1628; B41J 2/1629; B41J 2/1631; B41J 2/1642; B41J 2/1645; B41J 2/1646; B41J 2/1607
See application file for complete search history.

(56) References Cited

U.S. PATENT DOCUMENTS

| | | | | |
|---|---|---|---|---|
| 2005/0278951 A1* | 12/2005 | Matsuyama | B41J 2/1609 29/890.1 |
| 2006/0066685 A1* | 3/2006 | Sugahara | B41J 2/055 347/68 |
| 2009/0195606 A1* | 8/2009 | Hirasawa | B41J 2/1623 347/47 |

FOREIGN PATENT DOCUMENTS

| | | | | |
|---|---|---|---|---|
| JP | 2003072071 A * | 3/2003 | B01L 3/0268 |
| JP | 2008073961 A * | 4/2008 | B41J 2/16 |
| JP | 2013091272 A | 5/2013 | |

* cited by examiner

*Primary Examiner* — Yaovi M Ameh
(74) *Attorney, Agent, or Firm* — CANON U.S.A., INC. IP DIVISION

(57) ABSTRACT

A channel member includes a first substrate in which a channel is formed from a first surface, and a second substrate having a second surface facing the first surface, wherein the first substrate and the second substrate are bonded to each other with an adhesive between the first surface and the second surface, wherein the channel has a polygonal shape when viewed from a direction orthogonal to the first surface, wherein the channel includes a first portion on the first surface side and a second portion that communicates with the first portion, wherein an aperture area of the second portion is larger than an aperture area of the first portion when viewed from the direction orthogonal to the first surface, and wherein the adhesive is present on a step surface between the first portion and the second portion and at vertices of the polygonal shape.

8 Claims, 11 Drawing Sheets

FIG. 4A-A
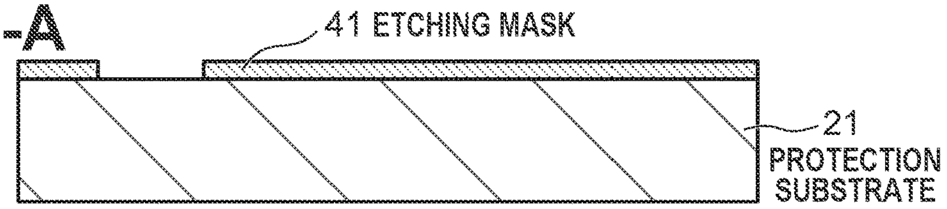
FIG. 4A-B
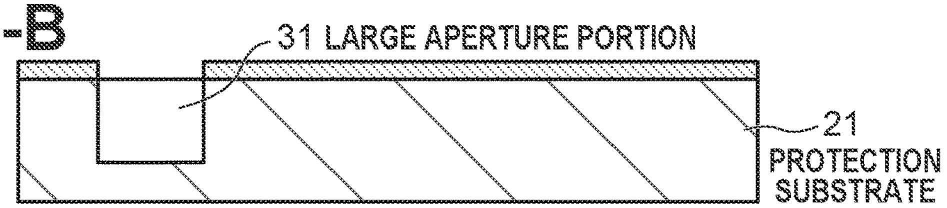
FIG. 4A-C
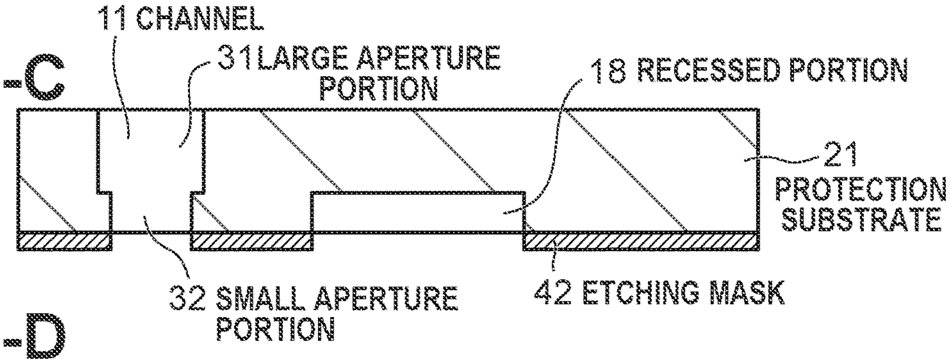
FIG. 4A-D
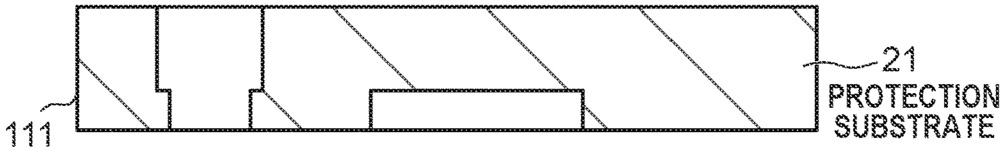
FIG. 4A-E
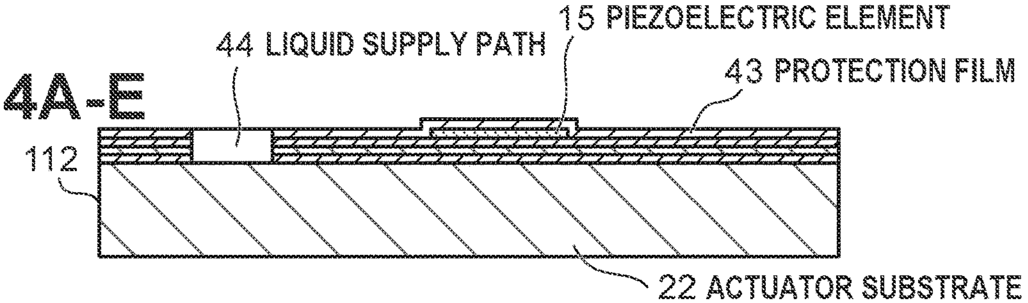
FIG. 4A-F
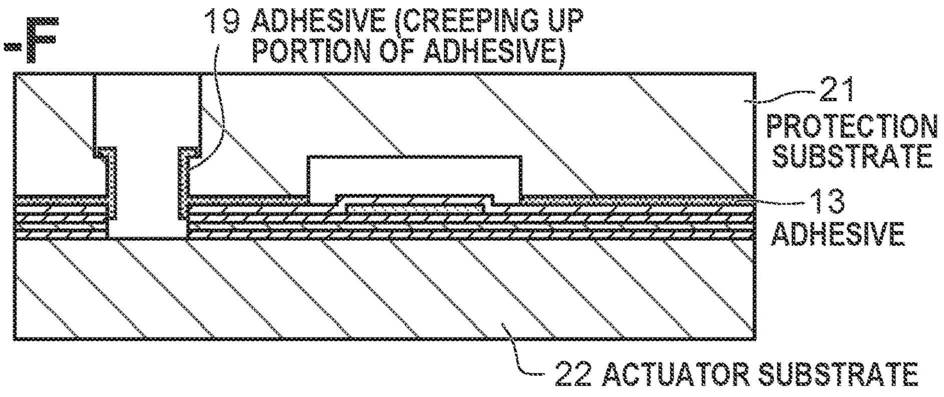

FIG. 4B-G
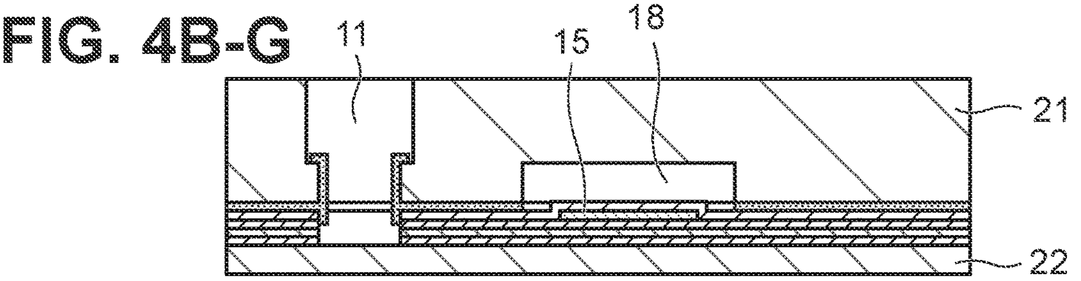
FIG. 4B-H
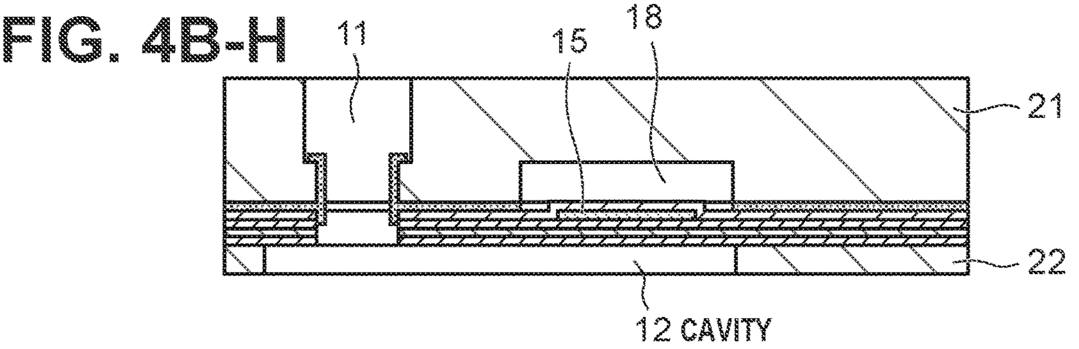
FIG. 4B-I
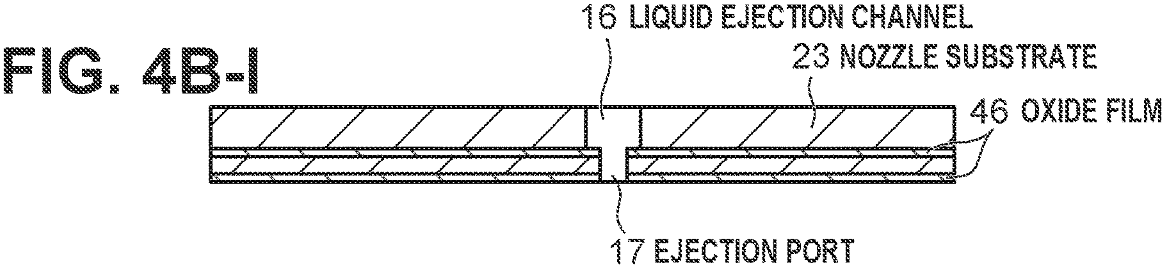
FIG. 4B-J
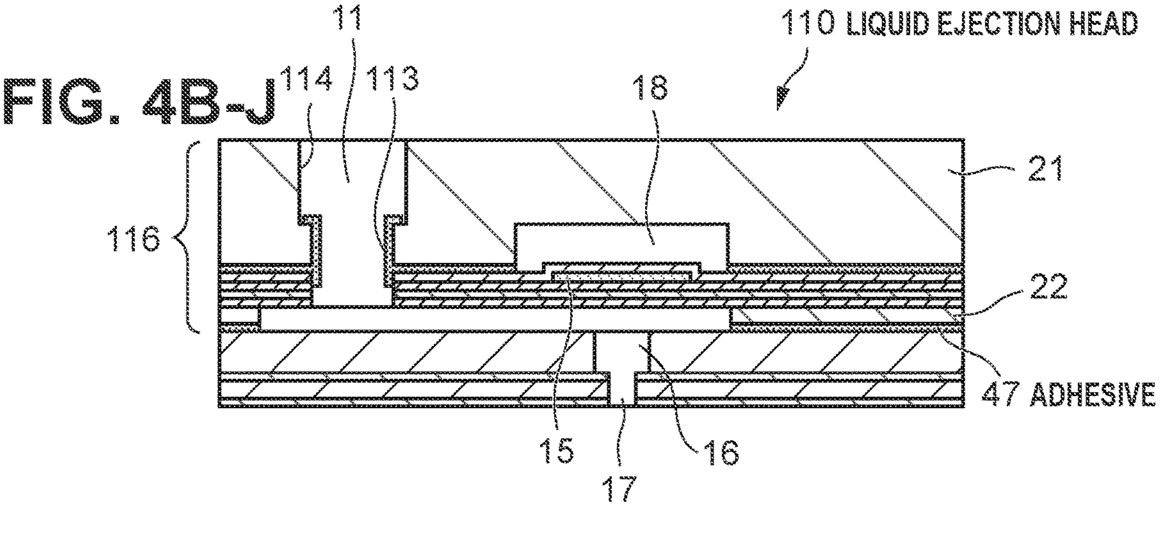

CHANNEL MEMBER AND LIQUID EJECTION HEAD

BACKGROUND

Field of the Disclosure

The present disclosure relates to a channel member and a liquid ejection head.

Description of the Related Art

Japanese Patent Application Laid-Open No. 2013-91272 discusses a liquid ejection apparatus that ejects liquid to perform recording. The liquid ejection apparatus includes a liquid ejection head that includes an ejection port that ejects liquid, a channel for supplying liquid to the ejection port, a piezoelectric element that generates pressure for ejection of liquid, and a pressure chamber on which pressure generated by the piezoelectric element acts.

The liquid ejection head as discussed in Japanese Patent Application Laid-Open No. 2013-91272 is typically formed by bonding a plurality of substrates, in which a channel is formed, using an adhesive, and liquid flows through the channel.

However, when a plurality of substrates is bonded together with an adhesive, there is a possibility that excessive adhesive flows into the channel and blocks the channel. When the channel is blocked, there occurs an issue that, for example, liquid cannot be supplied to the ejection port.

SUMMARY OF THE INVENTION

The present disclosure provides a channel member capable of preventing an adhesive from blocking a channel formed in a substrate and a liquid ejection head using the channel member.

According to an aspect of the present disclosure, a channel member includes a first substrate in which a channel is formed from a first surface, and a second substrate having a second surface facing the first surface, wherein the first substrate and the second substrate are bonded to each other with an adhesive between the first surface and the second surface, wherein the channel has a polygonal shape when viewed from a direction orthogonal to the first surface, wherein the channel includes a first portion on the first surface side and a second portion that communicates with the first portion, wherein an aperture area of the second portion is larger than an aperture area of the first portion when viewed from the direction orthogonal to the first surface, and wherein the adhesive is present on a step surface between the first portion and the second portion and at vertices of the polygonal shape.

Further features of the present disclosure will become apparent from the following description of exemplary embodiments with reference to the attached drawings.

BRIEF DESCRIPTION OF THE DRAWINGS

FIGS. 4A-A to 4A-F are diagrams illustrating a manufacturing process for the liquid ejection head.

FIGS. 4B-G to 4B-J are diagrams illustrating the manufacturing process for the liquid ejection head.

DESCRIPTION OF THE EMBODIMENTS

Exemplary embodiments of the present disclosure will be described below with reference to the drawings. There may be a case where a specific description is given of the exemplary embodiments described below to sufficiently explain the present disclosure, but the description merely indicates technical examples, and does not specifically limit the scope of the present disclosure.

Figure 1:
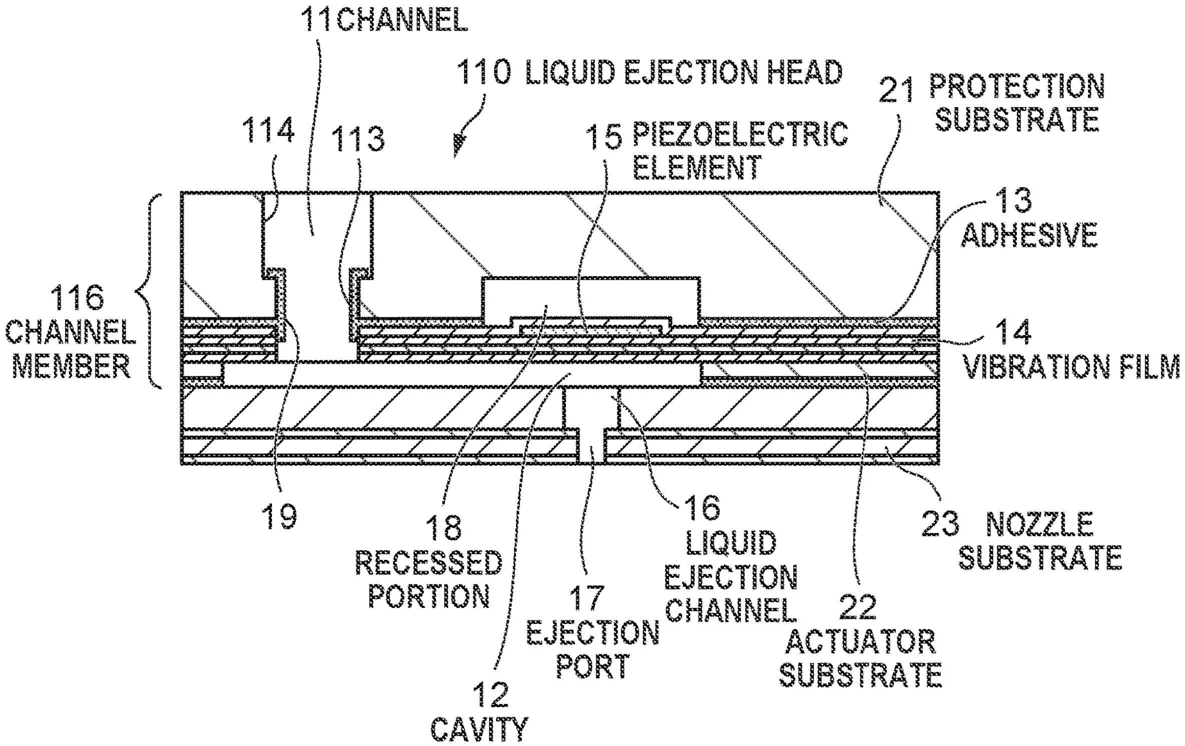
FIG. 1 is a cross-section view of a liquid ejection head.
Figure 2A:
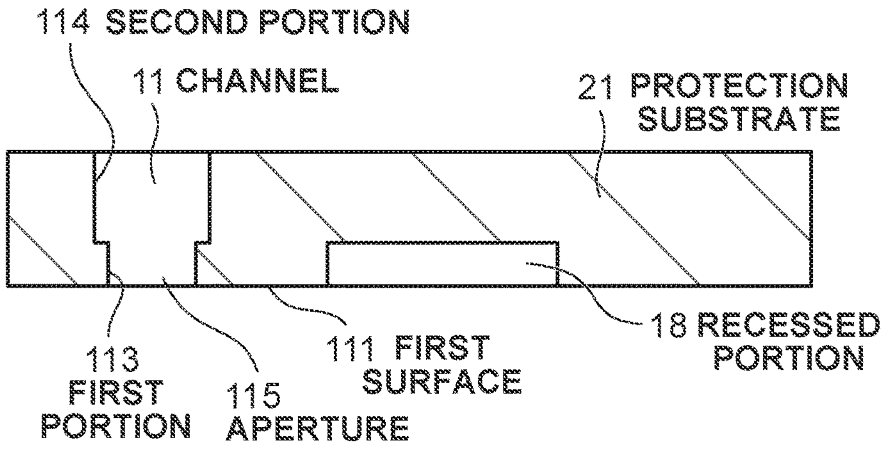
FIGS. 2A to 2C are cross-section views illustrating respective substrates before being bonded together.
Figure 2B:
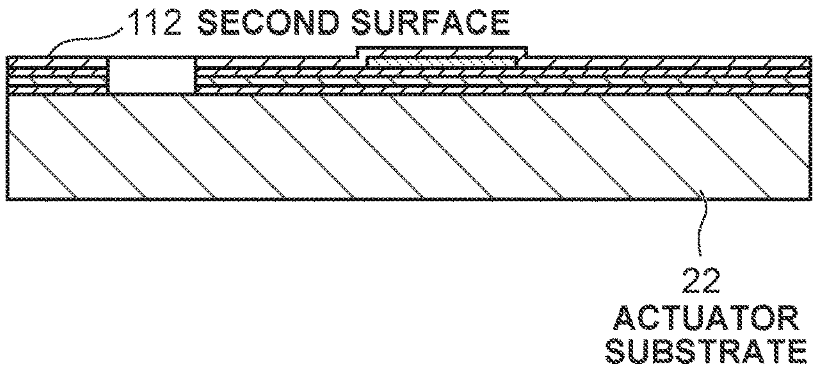
Figure 2C:
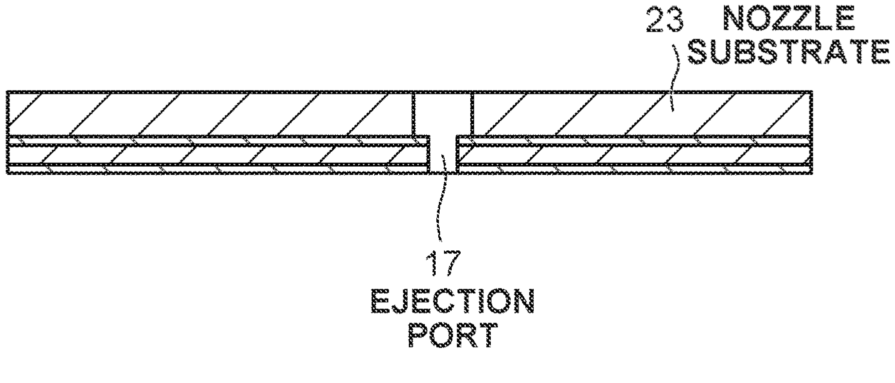

A first exemplary embodiment is described. FIG. 1 is a cross-section view of a liquid ejection head 110. FIG. 2A is a cross-section view of a protection substrate 21 before substrates illustrated in FIG. 1 are bonded together. FIG. 2B is a cross-section view of an actuator substrate 22 before the substrates illustrated in FIG. 1 are bonded together. FIG. 2C is a cross-section view of a nozzle substrate (ejection port substrate) 23 before the substrates illustrated in FIG. 1 are bonded together. As illustrated in FIG. 1, the liquid ejection head 110 includes at least the protection substrate 21 (first substrate), the actuator substrate 22 (second substrate), and the nozzle substrate 23 (third substrate). A channel member 116 includes the protection substrate 21 (first substrate) and the actuator substrate 22 (second substrate).

The actuator substrate 22 is formed of, for example, a silicon substrate, and sections a plurality of cavities (pressure chambers) 12. The actuator substrate 22 supports a vibration film 14 on a surface thereof.

The vibration film 14 forms a ceiling of the cavities 12, and sections the cavities 12.

A piezoelectric element (pressure generating element) 15 that generates pressure for ejection of liquid from an ejection port is arranged on the vibration film 14.

The nozzle substrate 23 is bonded to a back surface of the actuator substrate 22. The nozzle substrate 23 is formed of, for example, a silicon substrate, and is bonded to the back surface of the actuator substrate 22. The nozzle substrate 23 sections the cavities 12 together with the actuator substrate 22 and the vibration film 14. The nozzle substrate 23 includes a liquid ejection channel 16 that is arranged to overlap with a cavity portion, and an ejection port 17 is formed on a bottom surface of the liquid ejection channel 16. The ejection port 17 penetrates through the nozzle substrate 23, and is positioned on the opposite side of the cavities 12. Thus, when there occurs a change in the inner volume of each cavity 12, liquid accumulated in the cavity 12 passes through the liquid ejection channel 16, and is ejected from the ejection port 17.

The protection substrate 21 is formed of, for example, a silicon substrate. The protection substrate 21 is arranged so as to cover the piezoelectric element 15, and is bonded to the surface of the actuator substrate 22 with an adhesive 13.

With the adhesive 13 arranged between a first surface 111 and a second surface 112, the protection substrate 21 and the actuator substrate 22 are bonded together. The protection substrate 21 includes a recessed portion 18 on a surface thereof facing the surface of the actuator substrate 22. A plurality of piezoelectric elements 15 corresponding to the respective cavities 12 is accommodated inside respective recessed portions 18. In the recessed portion 18, a plurality of piezoelectric elements 15 corresponding to the plurality of cavities 12 are accommodated. The recessed portion 18 serves to protect the piezoelectric elements 15 from liquid.

A channel 11 formed in the protection substrate 21 (first substrate) includes a first portion 113 and a second portion 114. The first portion 113 is a portion that is connected to an aperture 115 on the actuator substrate 22 side of the channel 11. The second portion 114 is a portion that is connected to the first portion 113.

An ink tank (not illustrated) is arranged on the protection substrate 21. The channel 11 is formed so as to penetrate through the protection substrate 21. The channel 11 of the protection substrate 21 communicates with the cavities 12 inside the actuator substrate 22. Liquid inside the ink tank passes through the channel 11 and is supplied to the cavities 12.

The piezoelectric element 15 is arranged on the vibration film 14 to constitute a piezoelectric actuator. The piezoelectric element 15 includes a lower electrode (not illustrated) formed on a vibration film forming layer, and an upper electrode (not illustrated) formed on the piezoelectric element 15.

For example, a piezoelectric zirconate titanate (PZT) film formed by a sol-gel method or a sputtering method can be applied to the piezoelectric element 15. Such a piezoelectric element 15 is made of a sintered body of metal-oxide crystals.

The piezoelectric element 15 is formed at a position facing the cavity 12 across the vibration film 14. That is, the piezoelectric element 15 is formed so as to be in contact with the surface of the vibration film 14 on the opposite side of the cavity 12. The vibration film 14 has a characteristic of being deformable in a direction facing the cavity 12.

When a driving voltage is applied from a driving integrated circuit (IC) (not illustrated) to the piezoelectric element 15, the piezoelectric element 15 is deformed due to an inverse piezoelectric effect. The vibration film 14 is thus deformed together with the piezoelectric element 15. This causes a change in the inner volume of the cavity 12 and applies pressure to liquid inside the cavity 12. The pressurized liquid passes through the liquid ejection channel 16, and is ejected as micro droplets from the ejection port 17.

Figure 3:
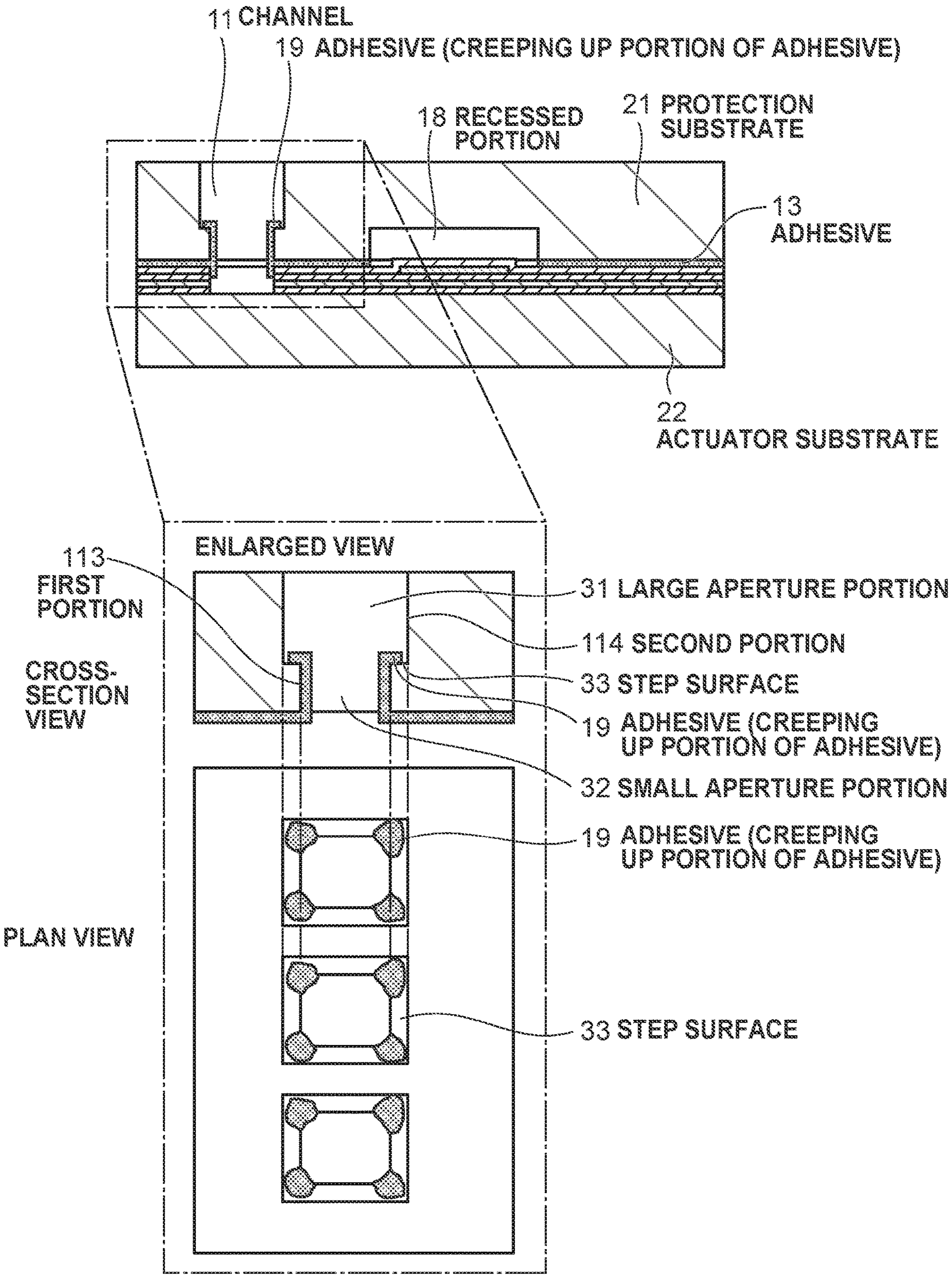
FIG. 3 is a diagram illustrating a first exemplary embodiment.

FIG. 3 illustrates a cross-section view and a plan view of the protection substrate 21 and the actuator substrate 22 that are bonded together with the adhesive 13. As illustrated in FIG. 3, the recessed portion 18 and the channel 11 are formed in the protection substrate 21. The protection substrate 21 is formed of a single substrate. A step (step portion) is formed at a connection portion between the first portion 113 and second portion 114 of the channel 11, and a step surface 33 is formed therebetween. When the channel 11 is seen from a direction orthogonal to the first surface 111 (i.e., in a plan view), the channel 11 has a polygonal shape having corners. In FIG. 3, the channel 11 has a quadrangle shape. An aperture area of the second portion 114 (large aperture portion 31) is larger than an aperture area of the first portion 113 (small aperture portion 32). Thus, the channel 11 formed in the protection substrate 21 has the step surface 33 in the middle of the channel 11 in a thickness direction of the protection substrate 21, and the large aperture portion 31 and the small aperture portion 32 communicate with each other therethrough. With this configuration, the channel 11 is formed so that a cross-section area thereof becomes larger from the first surface 111 toward the back surface thereof in the cross-section view.

With the corners in the channel 11, an adhesive 19 easily creeps up the corners due to a capillary phenomenon, and it becomes easy to control a position at which the adhesive 19 creeps up. If the channel 11 has, for example, a near-circular shape without corners, the adhesive 19 creeps up along the entire perimeter. As a result, there is a possibility that the adhesive 19 blocks the aperture portion of the channel 11 when seen in the plan view. In contrast, in the channel 11 having the corners, the adhesive 19 preferentially flows along the corners instead of the entire perimeter of the channel 11, and flows to the step surface 33 formed in the step portion. As a result, it is possible to prevent the adhesive 19 from blocking the channel 11. The configuration allows a certain amount of the adhesive 19 to be held on the step surface 33, and can thereby prevent the adhesive 19 from creeping up the upper portion of the channel 11 further than the step surface 33 and blocking the channel 11. Consequently, an excessive adhesive stays at the corners and on the step surface 33, and is prevented from blocking the channel 11.

In the present exemplary embodiment, a thickness of the protection substrate 21 is 100 μm to 600 μm. When seen in the cross-section view illustrated in FIG. 3, a length of the small aperture portion 32 of the channel 11 in a left-right direction is 50 μm to 100 inn, and a length of the large aperture portion 31 in the left-right direction is 80 μm to 150 μm. A relationship of the aperture area of the large aperture portion 31>the aperture area of the small aperture portion 32 is maintained, and is not to be reversed.

Subsequently, a manufacturing method for the liquid ejection head 110 is described with reference to FIGS. 4A-A to 4B-J. FIGS. 4A-A to 4B-J are schematic views of respective manufacturing processes. The manufacturing method for the liquid ejection head 110 mainly includes a process of forming the protection substrate 21, a process of forming the actuator substrate 22, a process of forming the nozzle substrate 23, and a process of bonding the substrates together. The manufacturing method according to the present exemplary embodiment is directed to prevention of creeping-up of the adhesive when the protection substrate 21 and the actuator substrate 22 are bonded together, but is also applied to a bonding process other than this bonding.

First, as illustrated in FIG. 4A-A, the protection substrate 21 (silicon substrate) with a thickness of 400 μm is prepared, an etching mask 41 having an aperture in a region in which the channel 11 is to be formed on a surface of the protection substrate 21 on the opposite side of a surface thereof which is bonded to the actuator substrate 22. A novolac-type photoresist is used for the etching mask 41. The etching mask 41 is formed by being exposing to light and subjected to development.

As illustrated in FIG. 4A-B, silicon (Si) dry etching is performed using this mask, whereby the large aperture portion 31 of the channel 11 is partially formed halfway in the thickness direction of the protection substrate 21. A depth of etching is set to 300 μm, an etching method called a Bosch process is used in which sulfur hexafluoride ($SF_6$) gas is used in an etching step and octafluorocyclobutane ($C_4F_8$) gas is used in a coating step. However, the large aperture portion 31 can be formed also by a method other than the Bosch process.

Subsequently, the etching mask 41 is removed. As illustrated in FIG. 4A-C, an etching mask 42 is formed on the surface of the protection substrate 21 that is bonded to the actuator substrate 22. A novolac-type positive photoresist is used to form the etching mask 42. The etching mask 42 is formed by being exposed to light and subjected to development.

Subsequently, with the etching mask 42 serving as a mask, the protection substrate 21 is etched by Si dry etching, the small aperture portion 32 is formed and caused to communicate with the large aperture portion 31, and thus the channel 11 is formed therein, as illustrated in FIG. 4A-C. As an etching condition at this time, the method that is the so-called Bosch process using the etching step and the coating step is used.

At the same time of formation of the small aperture portion 32, the recessed portion 18 for accommodating the vibration film 14 and a piezoelectric element portion formed afterwards on the surface of the actuator substrate 22 is also formed. A depth of the recessed portion 18 is from 100 μm to 120 μm.

Thereafter, the etching mask 42 is removed, and the protection substrate 21 is formed as illustrated in FIG. 4A-D.

Meanwhile, the process of preparing the actuator substrate 22 is as follows. First, as illustrated in FIG. 4A-E, the actuator substrate 22 (silicon substrate) having a thickness of 600 μm is prepared, and a vibration film formation layer is formed on the surface of the actuator substrate 22. The vibration film formation layer is formed of, for example, plasma chemical vapor deposition (CVD).

Subsequently, a hydrogen barrier film (not illustrated), the lower electrode (not illustrated), a piezoelectric body film, and the upper electrode (not illustrated) are sequentially formed on the vibration film formation layer. The lower electrode and the upper electrode are formed by, for example, the sputtering method. The piezoelectric body film is formed by the sol-gel method, but may be formed by the sputtering method. The piezoelectric element 15 is thus formed. An interlayer film and a wiring layer are formed so that an actuator unit can be driven, and the actuator substrate 22 is formed in this manner.

Subsequently, the plurality of films on the actuator substrate 22 is etched to form a liquid supply path 44 that penetrates the piezoelectric body film and the electrodes.

Subsequently, as illustrated in FIG. 4A-F, an adhesive is applied to the surface of the actuator substrate 22 facing the protection substrate 21 in thickness of 1.0 μm to 2.0 μm, and the actuator substrate 22 and the protection substrate 21 are bonded together so that the channel 11 and the liquid supply path 44 positionally correspond to each other. As a method of application of the adhesive, the adhesive is spin-coated on a dry film, and is then transferred onto the protection substrate 21. However, the method of application of the adhesive is not limited thereto, and screen printing or photolithographic patterning using a photosensitive adhesive may be performed instead.

The adhesive is desirably thick enough to eliminate a void at the time of bonding, and the thickness is 1.0 μm or more, desirably 2.0 μm, more desirably 5.0 μm or more. Thickening the adhesive increases an amount of adhesive creeping up the through-hole of the protection substrate 21 at the time of bonding, but the portion of adhesive creeping up the through-hole is trapped at the step portion between the small aperture portion 32 and the large aperture portion 31. Adopting the through-hole having the shape including the corners enables control of a position at which the adhesive creeps up, and makes it easy to catch the creeping-up of the adhesive.

As a result, the adhesive creeping up the corners flows to the step surface 33 formed in the step portion, thereby preventing the adhesive from blocking the channel 11.

Subsequently, as illustrated in FIG. 4B-G, the actuator substrate 22 is ground from the back surface thereof to be thinned down. Thereafter, the resist mask is formed on the back surface, and the cavity 12 is formed by dry etching as illustrated in FIG. 4B-H.

Subsequently, as illustrated in FIG. 4B-I, the nozzle substrate 23 is prepared. After the liquid ejection channel 16 is formed in the nozzle substrate 23, the actuator substrate 22 and the nozzle substrate 23 are bonded together, and then the ejection port 17 is formed. Thereafter, as illustrated in FIG. 4B-J, the nozzle substrate 23 is bonded to the back surface of the actuator substrate 22 so as to cover the cavity 12 in the actuator substrate 22.

Through the above-described processes, the liquid ejection head 110 according to the present exemplary embodiment is manufactured.

Figure 5:
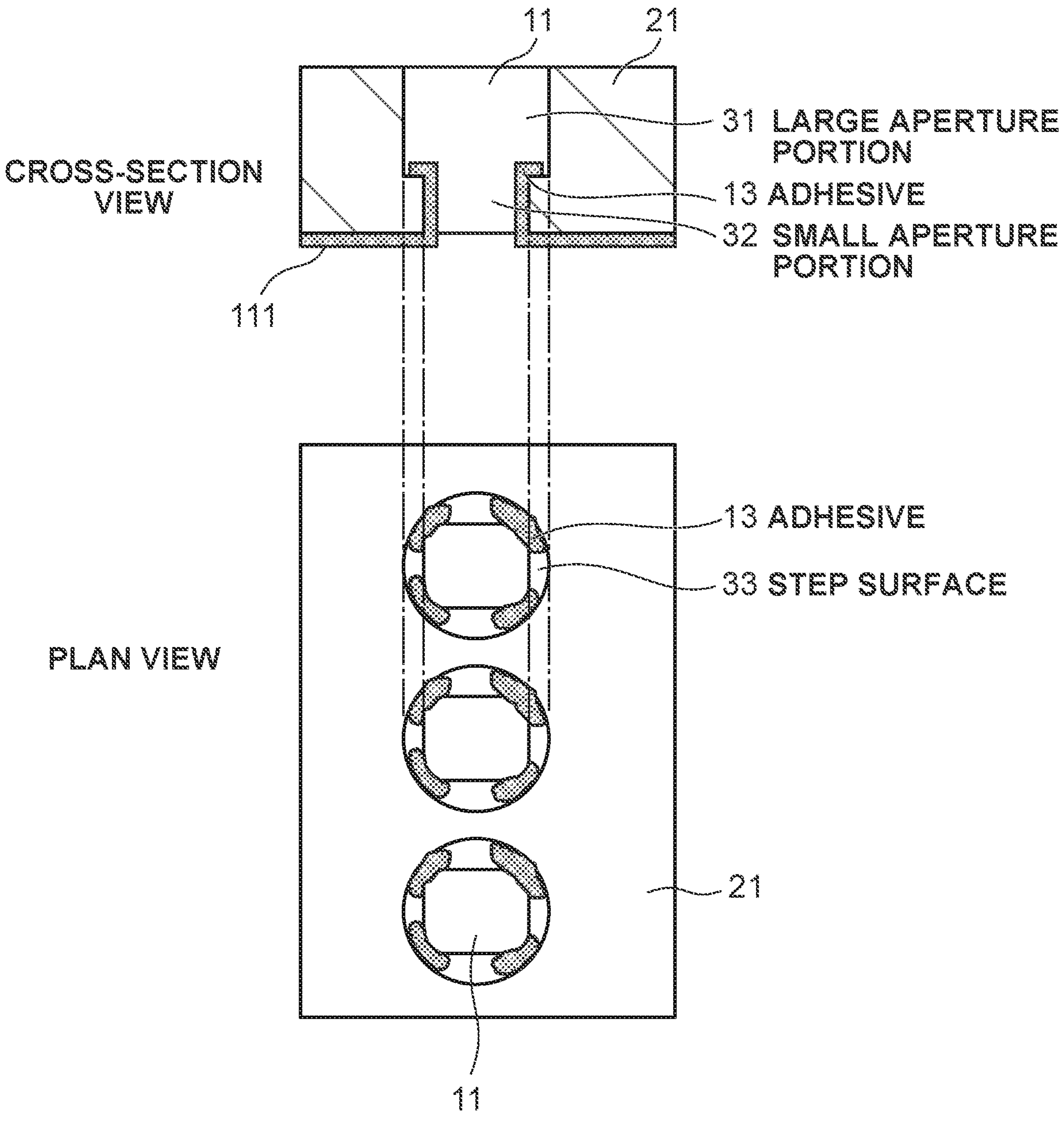
FIG. 5 is a diagram illustrating a second exemplary embodiment.

A second exemplary embodiment is now described. A part that is similar to that in the first exemplary embodiment is denoted by the same reference numeral or sign, and a description thereof is omitted. The description is given mainly of points different from the first exemplary embodiment. FIG. 5 illustrates a cross-section view and a plan view of the protection substrate 21 according to the present exemplary embodiment. In the present exemplary embodiment, as illustrated in FIG. 5, the large aperture portion 31 of the channel 11 in the protection substrate 21 has a circular shape in a plan view. This configuration causes the adhesive to creep up the corners of the small aperture portion 32, retains an excessive adhesive at the step surface 33 of the large aperture portion 31, and furthermore can prevent the adhesive from creeping up the channel 11 further from the step surface 33. The large aperture portion 31 having the circular shape has no corner along which the adhesive easily creeps up, so that the adhesive can be prevented from creeping up further.

Figure 6:
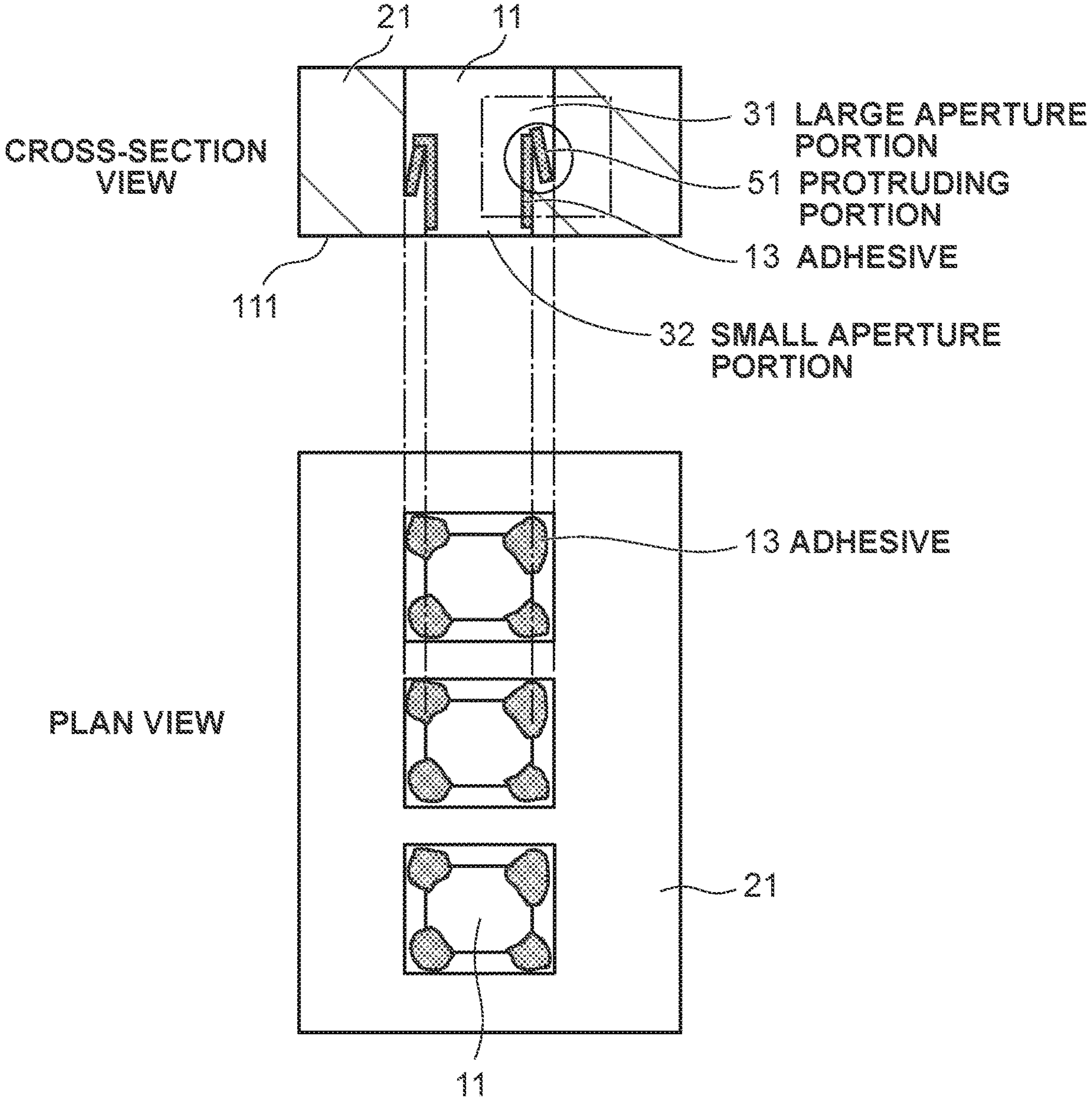
FIG. 6 is a diagram illustrating a third exemplary embodiment.

A third exemplary embodiment is now described. A part that is similar to that in the first exemplary embodiment is denoted by the same reference numeral or sign, and a description thereof is omitted. The description is given mainly of points different from the first exemplary embodiment. FIG. 6 illustrates a cross-section view and a plan view of the protection substrate 21 according to the present exemplary embodiment. In the present exemplary embodiment, a protruding portion 51 that protrudes toward the large aperture portion 31 (second portion) is arranged on the step surface 33 formed in the protection substrate 21. According to the present exemplary embodiment, since there is the protruding portion 51 at a destination where the adhesive creeps up the corners, the adhesive that have passed through the protruding portion 51 is easily caught at the step surface 33. Although there is a possibility that the adhesive is moved by the influence of heat or the like after the bonding, the adhesive caught between the protruding portion 51 and the step surface 33 is not moved further, and thus is further prevented from blocking the channel 11.

Figures 7A, 7B, 7C:
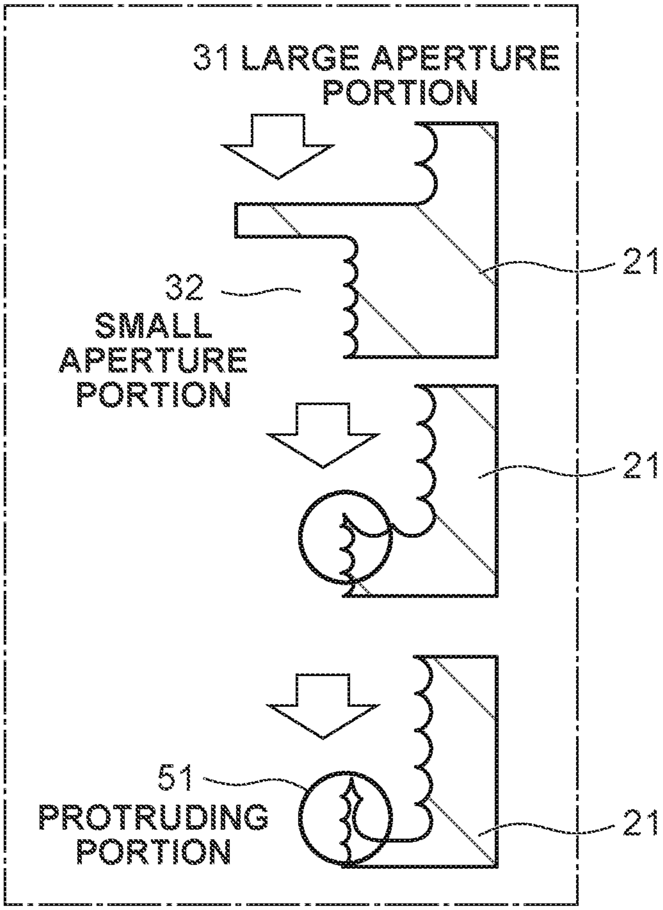
FIGS. 7A to 7C are diagrams illustrating a manufacturing process according to the third exemplary embodiment.

FIGS. 7A to 7C illustrate a manufacturing method for the protruding portion 51. The small aperture portion 32 and the large aperture portion 31 of the channel 11 in the protection substrate 21 are formed in a reverse order. That is, the large aperture portion 31 is formed after the small aperture portion 32 is formed and caused to communicate with the small aperture portion 32, and the protruding portion 51 is formed. As illustrated in FIGS. 7A and 7B, the small aperture portion 32 is processed to have a depth of about 100 μm, thereafter the large aperture portion 31 is processed from the opposite surface side to communicate with the small aperture portion 32, and thus the protruding portion 51 as illustrated in FIG. 7C can be formed.

Figure 8:
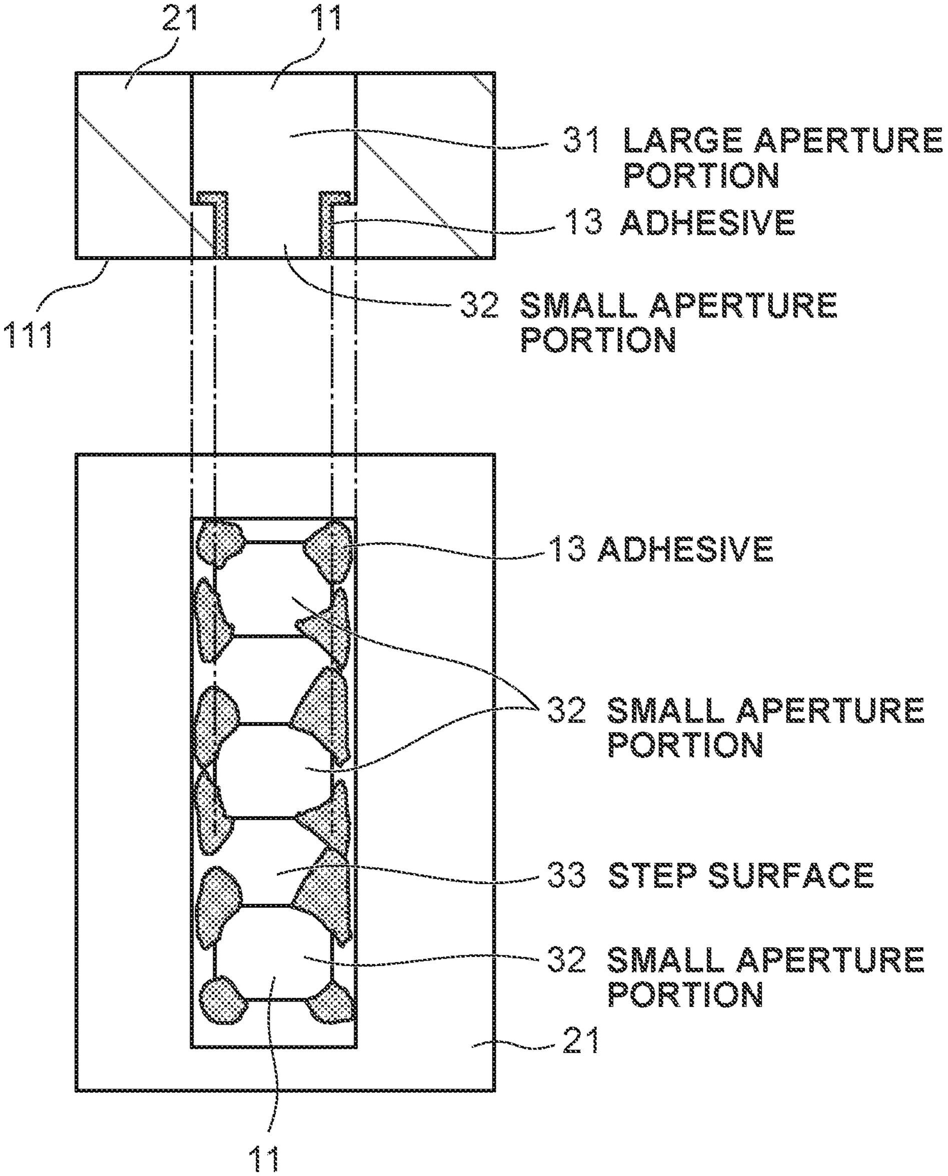
FIG. 8 is a diagram illustrating a fourth exemplary embodiment.

A fourth exemplary embodiment is now described. A part that is similar to that in the first exemplary embodiment is denoted by the same reference numeral or sign, and a description thereof is omitted. The description is given mainly of points different from the first exemplary embodiment. FIG. 8 illustrates a cross-section view and a plan view of the protection substrate 21 according to the present exemplary embodiment. The present exemplary embodiment is characterized in that, as illustrated in FIG. 8, a plurality of small aperture portions 32 is formed in the protection substrate 21, and one large aperture portion 31 communicates with the plurality of small aperture portions 32. With the configuration in which the large aperture portion 31 communicates with the plurality of small aperture portions 32, the step surface 33 has a large area where the adhesive creeping up the small aperture portions 32 is trapped, thereby further preventing the adhesive from blocking the channel 11. The large aperture portion 31 and the small aperture portions 32 are each formed by silicon reactive ion etching.

Figure 9A:
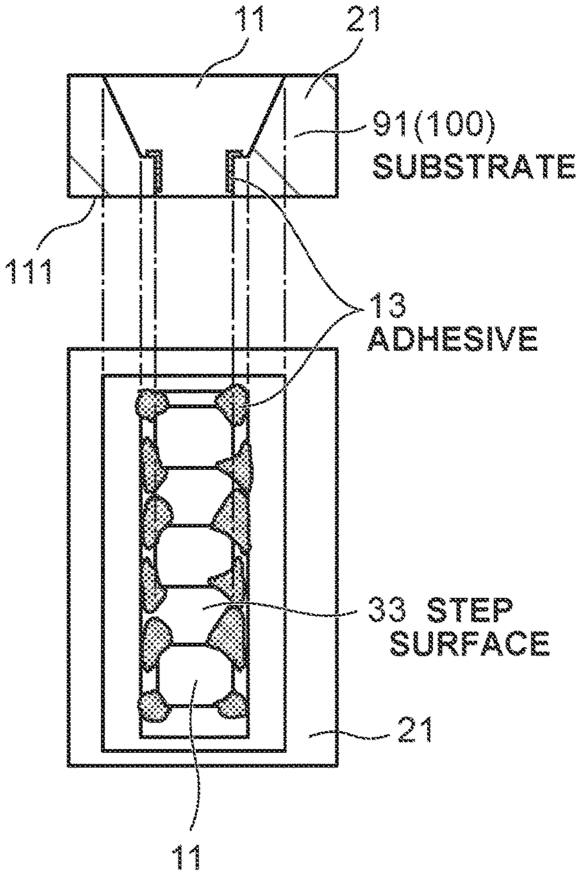
FIGS. 9A and 9B are diagrams each illustrating a fifth exemplary embodiment.
Figure 9B:
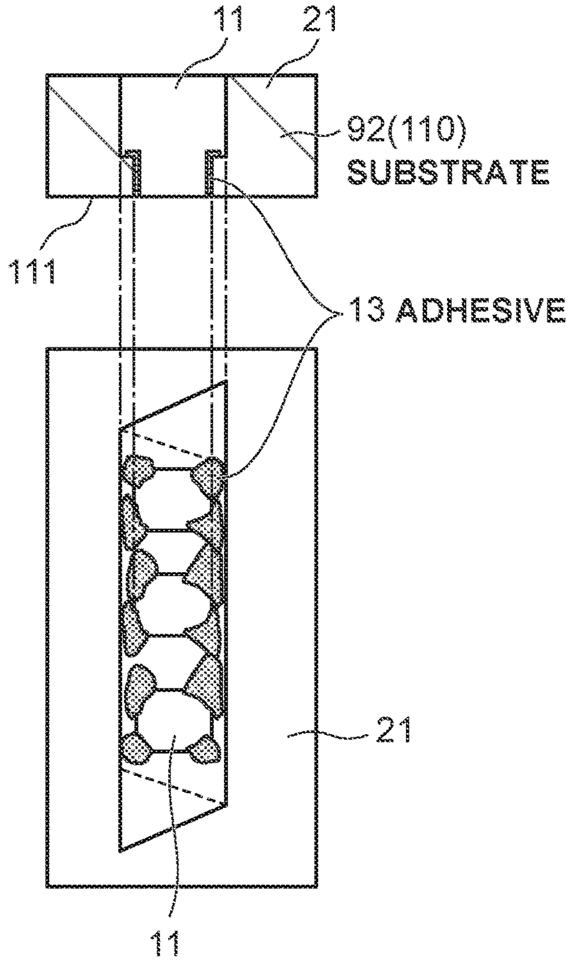

A fifth exemplary embodiment is now described. A part that is similar to that in the first exemplary embodiment is denoted by the same reference numeral or sign, and a description thereof is omitted. The description is given mainly of points different from the first exemplary embodiment. FIGS. 9A and 9B each illustrate a cross-section view and a plan view of the protection substrate 21 according to the present exemplary embodiment. In the present exemplary embodiment, the large aperture portion 31 of the channel 11 is formed in the protection substrate 21 by silicon anisotropic wet etching. The silicon anisotropic wet etching is performed using tetramethylammonium hydroxide (TMAH) as an etching solution, but an alkaline solution such as potassium hydroxide (KOH) may be used. FIG. 9A illustrates a case of using a (100) substrate as a silicon substrate. FIG. 9B illustrates a case of using a (110) substrate. In both of the substrates illustrated in FIGS. 9A and 9B, although the shapes are different from each other, the large aperture portion 31 is formed, and thereafter the small aperture portions 32 are formed on the surface on the opposite side to such that the large aperture portion 31 communicates with the respective large aperture portions 31. The small aperture portions 32 are formed by Si reactive ion etching.

In a case of using the (100) substrate, there is a concern that an area in a planar direction becomes large and a device chip becomes large in size, but there is an advantage in that the cost of the substrate is low. In addition, the aperture area of the large aperture portion 31 becomes larger toward the back surface of the first surface 111, and flow resistance thereby decreases, leading to an advantage in supply of ink. In a case of using the (110) substrate, on the other hand, there is concern that the cost of the substrate is high, but there is an advantage in that the device chip can be made small in size because the (110) substrate can be vertically formed in a cross-section direction as illustrated in FIG. 9B. Forming the large aperture portion 31 by anisotropic wet etching as in the fourth exemplary embodiment, enables a configuration in which the step surface 33 has a large area where the adhesive creeping up the corners of the small aperture portions 32 is trapped, and the channel 11 is less likely to be blocked.

Figure 10:
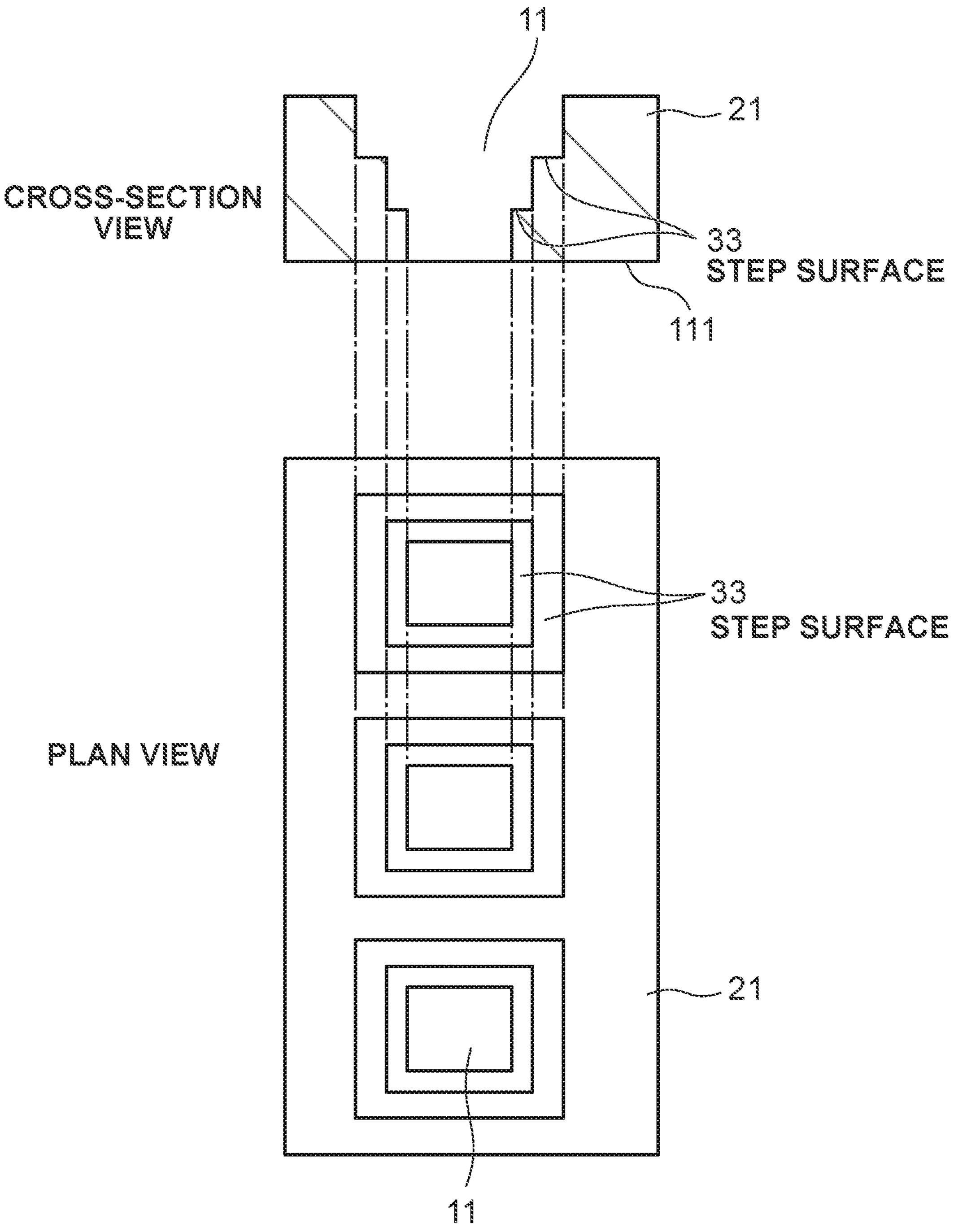
FIG. 10 is a diagram illustrating a sixth exemplary embodiment.

A sixth exemplary embodiment is now described. A part that is similar to that in the first exemplary embodiment is denoted by the same reference numeral or sign, and a description thereof is omitted. The description is given mainly of points different from the first exemplary embodiment. FIG. 10 illustrates a cross-section view and a plan view of the protection substrate 21 according to the present exemplary embodiment. In the present exemplary embodiment, as illustrated in FIG. 10, a plurality of (two in FIG. 10) step surfaces 33 is formed in the channel 11.

The formation of the plurality of step surfaces 33 means that there is a plurality of portions where the adhesive creeping up the corners is trapped. This configuration can further prevent the adhesive from blocking the channel 11.

The present disclosure enables provision of a channel member capable of preventing an adhesive from blocking a channel formed in a substrate and a liquid ejection head using the channel member.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-151988, filed Sep. 17, 2021, which is hereby incorporated by reference herein in its entirety.

What is claimed is:

1. A channel member, comprising:

a first substrate in which a channel is formed from a first surface; and a second substrate having a second surface facing the first surface, wherein the first substrate and the second substrate are bonded to each other with an adhesive between the first surface and the second surface, wherein the channel has a polygonal shape when viewed from a direction orthogonal to the first surface, wherein the channel includes a first portion on the first surface side and a second portion that communicates with the first portion, wherein an aperture area of the second portion is larger than an aperture area of the first portion when viewed from the direction orthogonal to the first surface, wherein the adhesive is present on a step surface between the first portion and the second portion and at vertices of the polygonal shape, and wherein a protruding portion that protrudes toward the second portion is formed on the step surface.

2. The channel member according to claim 1, wherein the second portion has a circular shape when the channel is viewed from the direction orthogonal to the first surface.

3. The channel member according to claim 1, wherein a plurality of first portions is formed in the first substrate, and wherein the plurality of first portions communicates with one second portion.

4. The channel member according to claim 1, wherein the aperture area of the second portion becomes larger toward a back surface of the first surface.

5. The channel member according to claim 1, wherein a plurality of step surfaces is formed.

6. A liquid ejection head, comprising:

an ejection port substrate including an ejection port configured to eject liquid; and a channel member including a channel configured to supply liquid to the ejection port, wherein the channel member includes:

a first substrate in which the channel is formed from a first surface; and a second substrate having a second surface facing the first surface, wherein the channel member is formed by bonding the first substrate and the second substrate to each other with an adhesive between the first surface and the second surface, wherein the channel has a polygonal shape when viewed from a direction orthogonal to the first surface, wherein the channel includes a first portion on the first surface side and a second portion that communicates with the first portion, wherein an aperture area of the second portion is larger than an aperture area of the first portion when the channel is viewed from the direction orthogonal to the first surface, wherein the adhesive is present on a step surface between the first portion and the second portion and at vertices of the polygonal shape, and wherein a protruding portion that protrudes toward the second portion is formed on the step surface.

7. The liquid ejection head according to claim 6, wherein the second substrate further includes a piezoelectric element configured to generate pressure for ejection of liquid, and wherein the first substrate further includes a recessed portion surrounding the piezoelectric element.

8. The liquid ejection head according to claim 6, wherein the ejection port substrate is bonded to the second substrate with an adhesive.

* * * * *